(12) United States Patent
Wang

(10) Patent No.: US 12,158,175 B1
(45) Date of Patent: Dec. 3, 2024

(54) LOCKABLE CONNECTING RING

(71) Applicant: YOKE INDUSTRIAL CORP., Taichung (TW)

(72) Inventor: Chia-Hsien Wang, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 0 days.

(21) Appl. No.: 18/199,876

(22) Filed: May 19, 2023

(51) Int. Cl.
*F16B 45/02* (2006.01)
*A62B 35/00* (2006.01)

(52) U.S. Cl.
CPC .......... *F16B 45/035* (2021.05); *F16B 45/027* (2021.05); *A62B 35/0037* (2013.01)

(58) Field of Classification Search
CPC ............ Y10T 24/1379; Y10T 24/4764; Y10T 24/45199; Y10T 24/45152; Y10T 24/1471; Y10T 24/45277; Y10T 24/3493; Y10T 24/45293; Y10T 24/45435; A44B 15/00; A44B 15/002; F16B 45/023; F16B 45/027; F16B 45/035; F16B 45/02; A44C 9/0046

See application file for complete search history.

(56) References Cited

U.S. PATENT DOCUMENTS

| | | | | |
|---|---|---|---|---|
| 1,209,083 | A * | 12/1916 | Wagner | F16B 45/035 24/598.2 |
| 1,702,218 | A * | 2/1929 | McKissick | F16B 45/027 24/599.5 |
| 2,362,454 | A * | 11/1944 | Damsel | F16L 23/04 285/112 |
| 2,447,921 | A * | 8/1948 | Thomas | B64D 17/32 24/265 AL |

(Continued)

FOREIGN PATENT DOCUMENTS

| | | |
|---|---|---|
| CN | 112145539 A | 12/2020 |
| DE | 212020000732 U1 | 9/2022 |
| TW | M644139 U | 7/2023 |

OTHER PUBLICATIONS

Search Report for TW112110614, Issued on Nov. 29, 2023, Total of 2 pages.

(Continued)

*Primary Examiner* — Robert Sandy
*Assistant Examiner* — Michael S Lee
(74) *Attorney, Agent, or Firm* — Apex Juris, pllc; Hilde Coecky

(57) ABSTRACT

A lockable connecting ring includes a first assembly and a second assembly connected to the first assembly. Two opposite ends of a rod body of the first assembly have a male linking portion and a female lockable portion, respectively. Two opposite ends of a rod body of the second assembly have a male lockable portion and a female linking portion, respectively. The male linking portion is pivotally connected to the female linking portion, and the female lockable portion is detachably connected to the male lockable portion by screwing. When the threaded connection of the lockable connecting ring is unlocked, the lockable connecting ring could be rotated along the pivotal connection to form an opening for allowing the rope to fit around the lockable connecting ring. Then, the female lockable portion is connected to the male lockable portion by screwing again to close the lockable connecting ring, which is convenient for use.

8 Claims, 7 Drawing Sheets

(56) References Cited

U.S. PATENT DOCUMENTS

| | | | | | |
|---|---|---|---|---|---|
| 3,744,825 | A | * | 7/1973 | Cooper | F16L 23/10 |
| | | | | | 24/279 |
| 4,091,646 | A | * | 5/1978 | Sugimoto | A44B 15/00 |
| | | | | | 70/459 |
| 4,561,678 | A | * | 12/1985 | Kunsman | F16L 17/04 |
| | | | | | 285/365 |
| 5,454,662 | A | * | 10/1995 | Skibitzke | F16B 7/06 |
| | | | | | 24/598.2 |
| 5,865,476 | A | * | 2/1999 | Kramer | F16L 33/02 |
| | | | | | 285/252 |
| 6,406,064 | B1 | * | 6/2002 | Morris | F16L 35/00 |
| | | | | | 403/204 |
| 2003/0177787 | A1 | * | 9/2003 | Kuo | A44C 9/0046 |
| | | | | | 63/15.45 |
| 2006/0107499 | A1 | * | 5/2006 | Wu | F16B 45/027 |
| | | | | | 24/600.6 |
| 2009/0320770 | A1 | * | 12/2009 | Rolain | F16B 45/023 |
| | | | | | 119/858 |
| 2015/0083884 | A1 | * | 3/2015 | Murphy | F16B 2/245 |
| | | | | | 248/551 |
| 2015/0223412 | A1 | * | 8/2015 | Vanderwall-Arnold | |
| | | | | | A01G 9/12 |
| | | | | | 47/45 |
| 2022/0087371 | A1 | * | 3/2022 | Newcomb | A44B 15/007 |

OTHER PUBLICATIONS

English Abstract for CN112145539A, Total of 1 page.
English Abstract for DE212020000732U, Total of 1 page.
English Abstract for TWM644139U, Total of 1 page.

* cited by examiner

LOCKABLE CONNECTING RING

BACKGROUND OF THE INVENTION

Technical Field

The present invention relates generally to an accessory of a safety device, and more particularly to a lockable connecting ring for connecting a rope, a safety harness, or the like.

Description of Related Art

When existing safety equipment connects ropes or safety harnesses in different directions, a ring body is provided for linking the safety equipment with the ropes or safety harnesses in different directions, which is generally called a connecting ring.

Although a conventional connecting ring can allow the safety device to connect with the ropes or the safety harnesses, the conventional connecting ring is inconvenient to use. Since the connecting ring is an integral ring body, the ropes or safety belts can only be sewn to form a loop for fixation after the ropes or safety belts is inserted into the connecting ring first. As a result, another rope or safety belt is difficult to be connected to the connecting ring after the connecting ring is set up, which limits the usage scenarios of the connecting ring.

BRIEF SUMMARY OF THE INVENTION

In view of the above, the primary objective of the present invention is to provide a lockable connecting ring that is formed by connecting two components. A side of each of the two components are pivotally connected, and the other side of each of the two components are threadedly connected. A side of the lockable connecting ring could be opened to be inserted by a rope or a safety harness, and then closed the lockable connecting ring. After the lockable connecting ring is closed, the lockable connecting ring could be provided for connecting with various ropes or safety harnesses in different directions. Additionally, the operation of the lockable connecting ring is to unlock or unscrew a side of the lockable connecting ring, which is convenient for a user.

The present inventive subject matter provides a lockable connecting ring, including a first assembly and a second assembly, and the first assembly is connected to the second assembly to form a ring body. The first assembly includes a first rod body, wherein two opposite ends of the first rod body have a male linking portion and a female lockable portion, respectively. The second assembly comprises a second rod body, wherein two opposite ends of the second rod body have a male lockable portion and a female linking portion, respectively. The male linking portion of the first assembly is pivotally connected to the female linking portion of the second assembly. The female lockable portion of the first assembly is detachably connected to the male lockable portion of the second assembly by screwing.

With such design, the female lockable portion and the male lockable portion could be unscrewed to open the lockable connecting ring. At the time, the rope and the safety harness could be inserted through the opening of the lockable connecting ring. Moreover, the size of the opening could be adjusted during the insertion on the required demand, so that various kinds of the ropes and the safety harness could be easily inserted into the lockable connecting ring. After that, the first female lockable portion and the male lockable portion are screwed to close the lockable connecting ring, so that the lockable connecting ring provides a function of connecting with the rope or the safety harness in various directions, which is convenient for the user.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
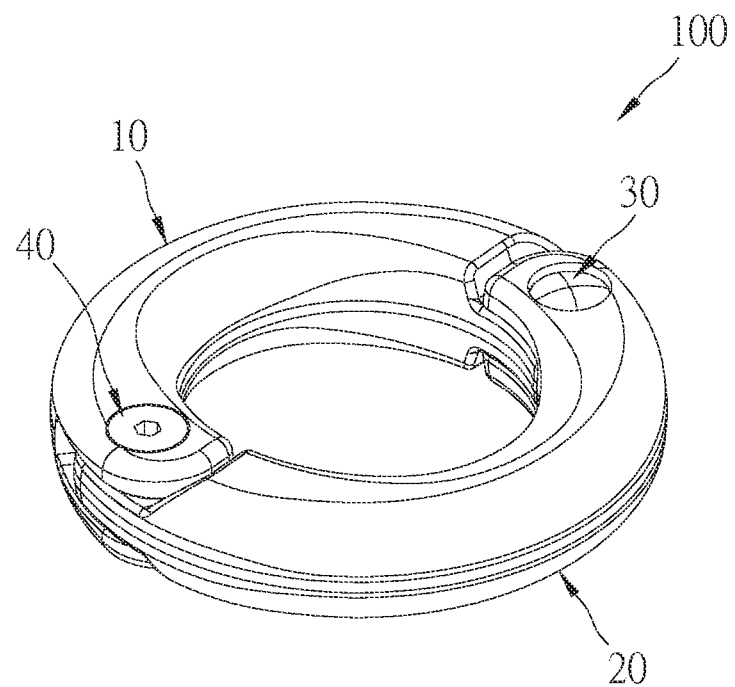
FIG. 1 is a perspective view of the lockable connecting ring of an embodiment according to the present invention.
Figure 2:
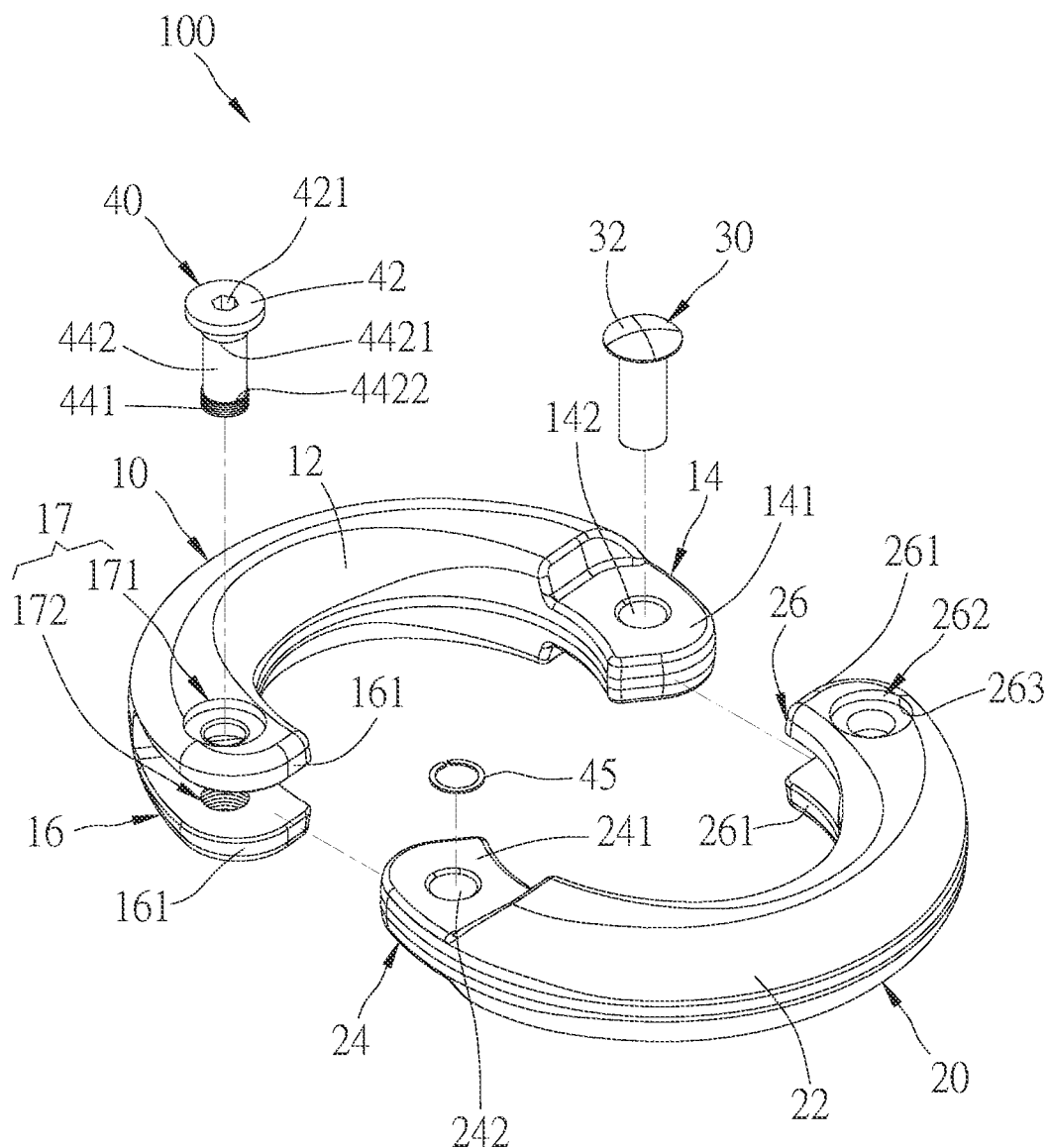
FIG. 2 is an exploded view of the lockable connecting ring of the first embodiment according to the present invention.
Figure 3:
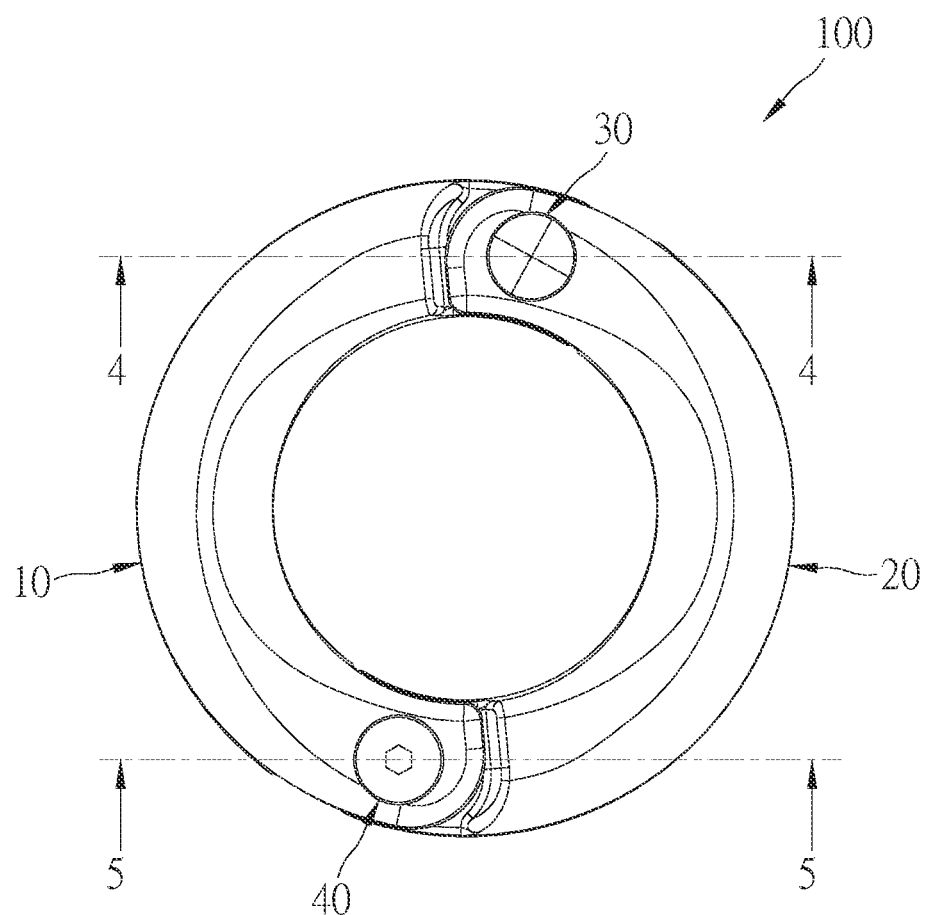
FIG. 3 is a top view of the lockable connecting ring shown in FIG. 1.
Figure 4:
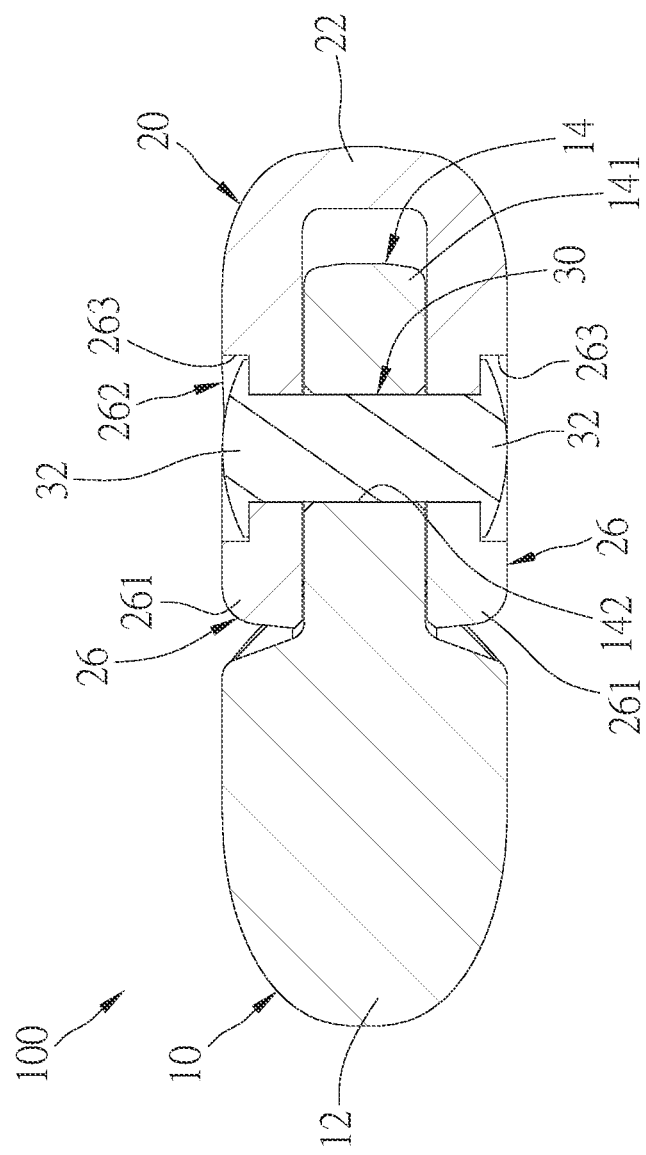
FIG. 4 is a sectional view taken along the 4-4 line in FIG. 3.

As illustrated in FIG. 1 to FIG. 5, a lockable connecting ring 100 of an embodiment according to the present invention, includes a first assembly 10 and a second assembly 20, wherein the first assembly 10 is connected to the second assembly 20 to form a ring body.

The first assembly 10 includes a first rod body 12, which is a C-shaped rod body, wherein two opposite ends of the first rod body 12 have a male linking portion 14 and a female lockable portion 16, respectively.

The second assembly 20 includes a second rod body 22, which is a C-shaped rod body, wherein two opposite ends of the second rod body 22 have a male lockable portion 24 and a female linking portion 26, respectively. The male linking portion 14 of the first assembly 10 is pivotally connected to the female linking portion 26 of the second assembly 20. The female lockable portion 16 of the first assembly 10 is detachably connected to the male lockable portion 24 of the second assembly 20 by screwing.

Figure 7:
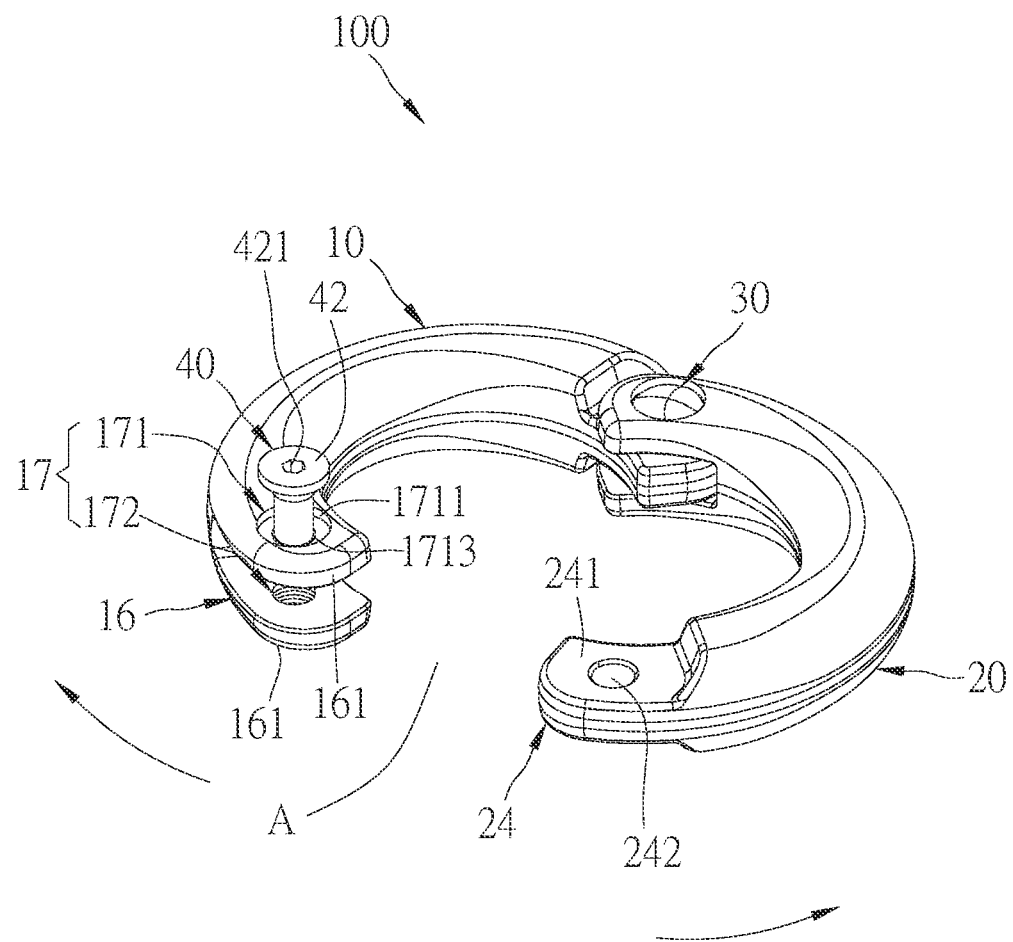
FIG. 7 is a schematic view, showing the lockable connecting ring is opened.

Since the male linking portion 14 is pivotally connected to the female linking portion 26, the lockable connecting ring 100 could be opened by pivotally rotating around a pivotally-connecting site between the male linking portion 14 and the female linking portion 26 after the male linking portion 14 and the female linking portion 26 are unlocked by unscrewing. As illustrated in FIG. 7, the female lockable portion 16 and the male lockable portion 24 are separated to form an opening A there between, and a size of the opening A of the lockable connecting ring 100 could be adjusted. At the time, a rope or a safety harness of a safety equipment could be inserted into the lockable connecting ring 100 through the opening A. After the rope or the safety harness is inserted by the lockable connecting ring 100, the female lockable portion 16 of the first assembly 10 and the male lockable portion 24 of the second assembly 20 are operated to connect with each other by screwing, thereby properly setting the lockable connecting ring 100.

The operation of the lockable connecting ring 100 of the current embodiment is very convenient. By simply loosening a threaded connection between the female lockable portion 16 and the male lockable portion 24, the lockable connecting ring 100 could be inserted by the rope or the safety harness. Additionally, the size of the opening A could be adjusted on a required demand, so that a various kinds of the ropes and the safety harnesses could easily fit around the lockable connecting ring 100. Even though the ropes and the safety harnesses have been sewed to form a loop, the loops of the ropes and the safety harnesses could easily fit around the lockable connecting ring 100.

As illustrated in FIG. 2 to FIG. 5, the male linking portion 14 and the female linking portion 26 are pivotally connected. More specifically, the male linking portion 14 includes a first protrusion 141, wherein the first protrusion 141 is a plate and has a first perforation 142. The female linking portion 26 includes two second extending arms 261 that are spaced from each other, wherein each of the two second extending arms 261 is a plate. A second perforation 262 is bored through the two second extending arms 261. More specifically, the second perforation 262 includes two second perforation 262 that are coaxial, wherein each of the two second perforation 262 passes through one of the two second extending arms 261. The two second perforations 262 are counterbores, so that each of the two second perforations 262 has an enlarged section 263 that is formed on one of the second extending arms 261. The first protrusion 141 is inserted into a recess formed between the two second extending arms 261 to allow the two second perforations 262 to be aligned with the first perforation 142. After that, a connecting member 30 passes through the first perforation 142 and the second perforations 262.

In the current embodiment, the connecting member 30 is a rivet, and each of two opposite ends of the connecting member 30 has a rivet head 32, wherein each of the two rivet heads 32 is embedded and located in one of the enlarged section 263. With such design, the first assembly 10 and the second assembly 20 could be rotated about the connecting member 30 to open or close the lockable connecting ring 100.

As illustrated in FIG. 2 to FIG. 5, the female lockable portion 16 are detachably connected to the male lockable portion 24 by screwing. More specifically, the female lockable portions 16 has two first extending arms 161 that are spaced from each other, wherein each of the two first extending arms 161 is a plate. A first hole 17 is bored through the two first extending arms 161. More specifically, the first hole 17 includes two first holes 17 that are coaxial, wherein each of the two first holes 17 passes through one of the two first extending arms 161. The two first holes 17 on one of the two first extending arms 161 has a counterbore portion 171 on the corresponding one of the two first extending arms 161. The two first holes 17 on the other one of the two first extending arms 161 has a threaded section 172. The male lockable portion 24 has a second protrusion 241, wherein the second protrusion 241 is a plate and has a second hole 242, which is a through hole. The second protrusion 241 is inserted into a recess formed between the two first extending arms 161 to allow the second hole 242 be aligned with the two first holes 17. After that, a fastener 40 passes through the first holes 17 and the second hole 242 and is detachably engaged with one of the first holes 17, which has a threaded section 172.

In the current embodiment, the fastener 40 has a head 42 and a rod 44 that is coaxially connected to the head 42. An outer diameter of the head 42 is greater than an outer diameter of the rod 44, and the head 42 has a drive 421, wherein the drive 421 is a hexagon recess. In other embodiments, the drive 421 could be a Phillips drive or a slotted drive. A circumference of a distal end of the rod 44 has a threaded portion 441. When the fastener 40 is engaged with the second hole 242 and the first holes 17 by screwing, the head 42 of the fastener 40 is embedded in the counterbore portion 171 of the first hole 17, and the rod 44 passes through the second hole 242 to screw with the threaded section 172 of the first hole 17.

Figure 5:
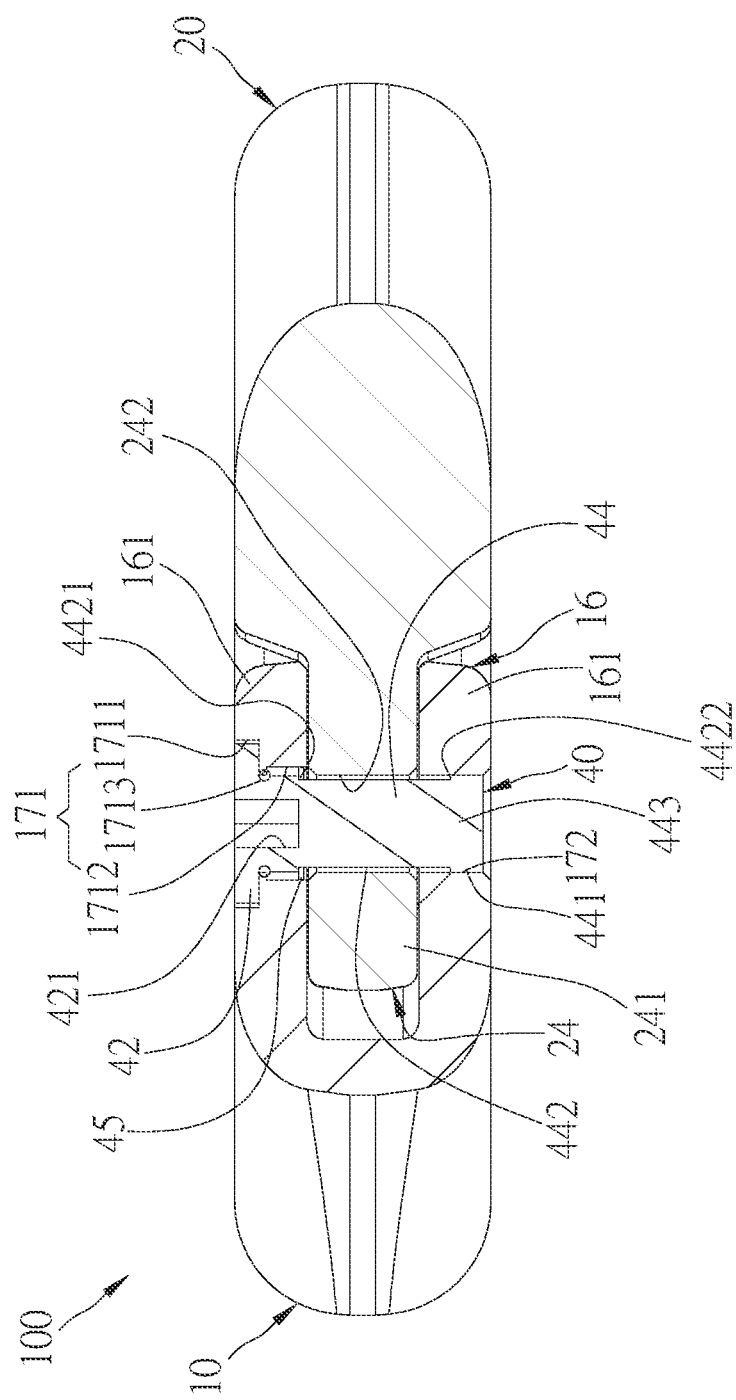
FIG. 5 is a sectional view taken along the 5-5 line in FIG. 3.
Figure 6:
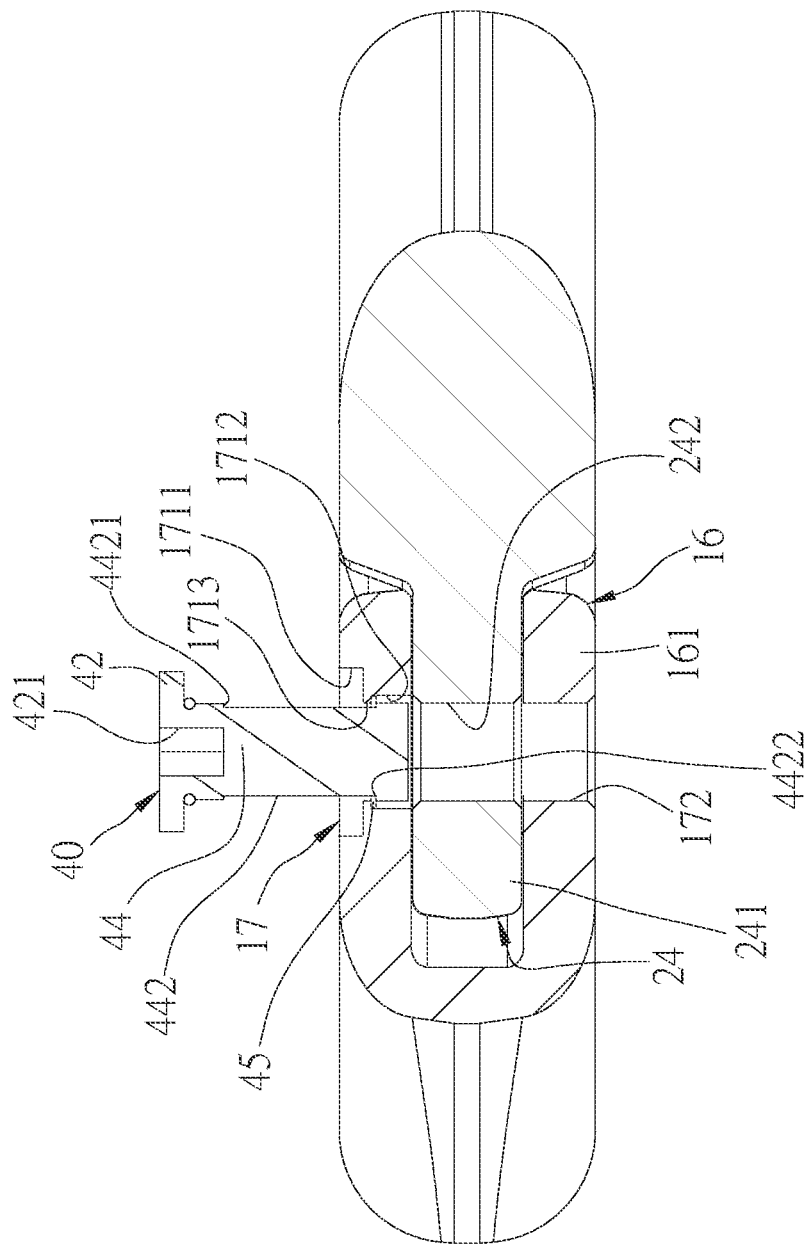
FIG. 6 is a schematic view, showing the fastener in FIG. 5 is unscrewed.

As illustrated in FIG. 5 to FIG. 7, the following structure is adapted to prevent the fastener 40 from being disengaged from one of the two first holes 17 when the fastener 40 is disengaged from the threaded section 172 of the other one of the two first holes 17, thereby avoiding the fastener 40 to be lost due to disengagement from the one of the two first holes 17. The counterbore portion 171 has a first section 1711, a second section 1712, and an annular flange 1713, wherein a diameter of the first section 1711 is greater than a diameter of the second section 1712. The annular flange 1713 is formed by protruding inwardly and is located between the first section 1711 and the second section 1712. An outer circumference of the rod 44 of the fastener 40 has an annular groove 442, wherein the annular groove 442 has a first side wall 4421 close to the head 42 and a second side wall 4422 away from the head 42. A stopper 45, a C-shaped buckle, slidably fits around the annular groove 442.

The stopper 45 is located in the second section 1712, an outer diameter of the stopper 45 is greater than an inner diameter of the annular flange 1713, and the outer diameter of the stopper 45 is greater than a diameter of the second hole 242. A portion of the rod 44 where is between the second side wall 4422 and the distal end of the rod 44 is defined as a distal end portion 443. The threaded portion 441 is formed on an outer circumference of the distal end portion 443. The distal end portion 443 could be received in the second section 1712 of the counterbore portion 171. With such design, when the fastener 40 is loosened to unlock the connection between the female lockable portion 16 and the male lockable portion 24, the threaded portion 441 of the fastener 40 is disengaged from the threaded section 172 to allow the fastener 40 could be withdrawn through the second hole 242. After the threaded portion 441 of the fastener 40 is drawn out from the second hole 242, the stopper 45 abuts against the annular flange 1713, and the annular flange 1713 of the rod 44 could slide along an inner circumference of the stopper 45 until the distal end portion 443 is received in the second section 1712. When the second side wall 4422 abuts against the stopper 45, the fastener 40 could not be drawn out further. As a result, the fastener 40 could be prevented from separating from the counterbore portion 171 of the first hole 17, thereby enhancing the reliability of the lockable connecting ring 100.

When the distal end portion 443 of the fastener 40 enters into the second section 1712 of the counterbore portion 171, the fastener 40 could no longer restrict the male lockable portion 24 from moving. At the time, the first assembly 10 and the second assembly 20 could be pivotally rotated along the connecting member 30 to depart the male lockable portion 24 and the female lockable portion 16, thereby opening the lockable connecting ring 100. On the contrary, when the male lockable portion 24 needs to be engaged with the female lockable portion 16, the first assembly 10 and the second assembly 20 are rotated to allow the first holes 17 to be aligned with the second hole 242, and then the rod 44 of the fastener 40 is moved to pass through the second hole 242 and is screwed to make the threaded portion 441 be engaged with the threaded section 172. During the process of closing the connecting ring 100, the stopper 45 abuts against an edge of the second hole 242, because the outer diameter of the stopper 45 is greater than the diameter of the second hole 242. The annular groove 442 of the rod 44 slides along an inner wall of the stopper 45. When the fastener 40 is screwed with the threaded section 171 to be fixed in the first holes 17 and the second hole 242, the stopper 45 is located in the second section 1712.

It must be pointed out that the embodiment described above is only a preferred embodiment of the present invention. All equivalent structures and methods which employ the concepts disclosed in this specification and the appended claims should fall within the scope of the present invention.

What is claimed is:

1. A lockable connecting ring, comprising:
   a first assembly and a second assembly, and the first assembly is connected to the second assembly to form a ring body,
   wherein the first assembly comprises a first rod body, wherein two opposite ends of the first rod body have a male linking portion and a female lockable portion, respectively;
   wherein the second assembly comprises a second rod body, wherein two opposite ends of the second rod body have a male lockable portion and a female linking portion, respectively;
   wherein the male linking portion of the first assembly is pivotally connected to the female linking portion of the second assembly; and the female lockable portion of the first assembly is detachably connected to the male lockable portion of the second assembly by screwing;
   wherein the female lockable portion has a first hole, the male lockable portion has a second hole; the second hole is overlapped with the first hole, and a fastener detachably passes through the first hole and the second hole, the fastener has a rod;
   wherein the first hole has an annular flange protruding inwardly, an outer circumference of the rod of the fastener has an annular groove; a stopper slidably fits around the annular groove; the stopper is located in the first hole; an outer diameter of the stopper is greater than an inner diameter of the annular flange, and the outer diameter of the stopper is greater than a diameter of the second hole.

2. The lockable connecting ring as claimed in claim 1, wherein the first rod body of the first assembly is a C-shaped rod, and the male linking portion has a first perforation; the second rod body of the second assembly is a C-shaped rod, and the female linking portion has a second perforation; the second perforation is aligned with the first perforation, and a connecting member passes through the first perforation and the second perforation.

3. The lockable connecting ring as claimed in claim 2, wherein the male linking portion has a first protrusion, and the first protrusion has a first perforation; the female linking portion comprises two extending arms that are spaced from each other; the second perforation passes through each of the two extending arms of the female linking portion; the first protrusion is inserted between the two extending arms of the female linking portion.

4. The lockable connecting ring as claimed in claim 3, wherein the second perforation forms an enlarged section on each of the two extending arms of the female linking portion; the connecting member is a rivet, and each of two ends of the rivet has a rivet head; each of the two rivet heads is embedded into one of the two enlarged sections.

5. The lockable connecting ring as claimed in claim 1, wherein the female lockable portion has two extending arms that are spaced from each other; the first hole passes through each of the two extending arms of the female lockable portion; the male lockable portion has a second protrusion, and the second protrusion has the second hole; the second protrusion is inserted between the two extending arms of the female lockable portion.

6. The lockable connecting ring as claimed in claim 5, wherein the first hole on one of the two extending arms of the female lockable portion has a counterbore portion; the first hole on the other one of the two extending arms of the female lockable portion has a threaded section; the fastener has a head and the rod that is coaxially connected to the head; the head is embedded in the counterbore portion and has a drive; a distal end of the rod has a threaded portion; the rod passes through the second hole to screw with the threaded section of the first hole.

7. The lockable connecting ring as claimed in claim 6, wherein the counterbore portion has a first section and a second section, the annular flange is located between the first section and the second section; the annular groove has a first side wall close to the head and a second side wall away from the head; the stopper is located in the second section of the counterbore portion; a portion of the rod between the second side wall and the distal end of the rod is defined as a distal end portion, and the threaded portion is formed on an outer circumference of the distal end portion; the distal end portion is capable to be received in the second section of the counterbore portion.

8. The lockable connecting ring as claimed in claim 6, wherein the drive of the head comprises a hexagon recess, a Phillips drive, or a slotted drive.

\* \* \* \* \*